United States Patent
Sasaki

(10) Patent No.: US 10,317,755 B2
(45) Date of Patent: Jun. 11, 2019

(54) DISPLAY DEVICE AND DISPLAY METHOD

(71) Applicant: Sharp Kabushiki Kaisha, Osaka (JP)

(72) Inventor: Takashi Sasaki, Osaka (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 33 days.

(21) Appl. No.: 15/518,206

(22) PCT Filed: Aug. 28, 2015

(86) PCT No.: PCT/JP2015/074417
§ 371 (c)(1),
(2) Date: Apr. 10, 2017

(87) PCT Pub. No.: WO2016/059894
PCT Pub. Date: Apr. 21, 2016

(65) Prior Publication Data
US 2017/0307926 A1    Oct. 26, 2017

(30) Foreign Application Priority Data
Oct. 17, 2014 (JP) .................. 2014-213068

(51) Int. Cl.
*G02F 1/1345* (2006.01)
*G02F 1/29* (2006.01)
(Continued)

(52) U.S. Cl.
CPC ........ *G02F 1/13454* (2013.01); *G02F 1/0344* (2013.01); *G02F 1/29* (2013.01); *G06T 1/20* (2013.01); *G09G 3/3648* (2013.01); *G09G 3/3688* (2013.01); *G02F 2001/136281* (2013.01); *G06T 3/0056* (2013.01);
(Continued)

(58) Field of Classification Search
CPC .............. G09G 3/3648; G09G 3/3688; G09G 2310/027; G09G 2310/0278; G02F 1/13454; G02F 1/0344; G02F 1/29; G06T 1/20
See application file for complete search history.

(56) References Cited

U.S. PATENT DOCUMENTS

2001/0003447 A1    6/2001   Murai et al.
2006/0012550 A1    1/2006   Wang et al.
(Continued)

FOREIGN PATENT DOCUMENTS

| JP | 2001-166277 A | 6/2001 |
| JP | 2004-86093 A | 3/2004 |

(Continued)

*Primary Examiner* — Sardis F Azongha
(74) *Attorney, Agent, or Firm* — ScienBiziP, P.C.

(57) ABSTRACT

An image signal line driver circuit includes first to third source drivers and fourth to sixth source drivers, which are respectively cascade-connected. The output duration of data signals that are provide to these source drivers is increasingly short on the source drivers that are connected further downstream (that is, the amount of pixel data to be output to the next stage is increasingly small). This reduces the power consumption and heat generation of the overall device. Moreover, the phases of the data signals are shifted, thereby reducing EMI. In this way, when a plurality of image signal line driver circuits are cascade-connected, heat generation and power consumption in each driver circuit and/or EMI therebetween is reduced.

14 Claims, 6 Drawing Sheets

(51) Int. Cl.
  *G02F 1/03*    (2006.01)
  *G02F 1/1362*  (2006.01)
  *G06T 3/00*    (2006.01)
  *G09G 3/36*    (2006.01)
  *G06T 1/20*    (2006.01)

(52) U.S. Cl.
  CPC . *G09G 2330/021* (2013.01); *G09G 2330/045* (2013.01); *G09G 2330/06* (2013.01)

(56) References Cited

U.S. PATENT DOCUMENTS

| | | |
|---|---|---|
| 2007/0132701 A1 | 6/2007 | Jeon |
| 2008/0074406 A1 | 3/2008 | Matsumoto et al. |
| 2012/0081349 A1 | 4/2012 | Tomita |
| 2014/0062989 A1 | 3/2014 | Ebisuno et al. |

FOREIGN PATENT DOCUMENTS

| | | |
|---|---|---|
| JP | 2006-30949 A | 2/2006 |
| JP | 2006-330029 A | 12/2006 |
| JP | 2007-164181 A | 6/2007 |
| JP | 2008-83303 A | 4/2008 |
| JP | 2012-78645 A | 4/2012 |
| WO | 2013/094104 A1 | 6/2013 |

DISPLAY DEVICE AND DISPLAY METHOD

TECHNICAL FIELD

The present invention relates to a display device, and more particularly to an active-matrix display device that includes a plurality of image signal line driver circuits and to a display method therefor.

BACKGROUND ART

In recent years, active-matrix display devices with increasingly high resolutions have been developed. In such devices, a plurality of image signal line driver circuits are sometimes provided to distribute the driving load. In this case, image signals from another device are input to a display control circuit that includes a timing controller and then transmitted to each of the image signal line driver circuits. There are various well-known technologies for transmitting these image signals.

In one example of such a technology, a common bus line is provided for the plurality of image signal line driver circuits, and the image data for each image signal line driver circuit is sent via this bus line. This scheme is known as a "multidrop" scheme. In another example of such a technology, signal lines are formed connecting between the display control circuit and the image signal line driver circuits in a one-to-one relationship, and the image data for each image signal line driver circuit is sent directly from the display control circuit via these signal lines. This scheme is known as a "P to P" scheme.

However, the multidrop scheme described above typically requires use of relatively large transmission cables, connectors, substrates, and the like because the bus line includes a large number of signal lines, which tends to result in high costs. Moreover, while the P to P scheme described above does not require the bus line used in the multidrop scheme, the number of signal lines for transmitting image data must correspond to the number of image signal line driver circuits, and this number is ultimately limited.

Japanese Patent Application Laid-Open Publication No. 2006-30949, for example, discloses a configuration for solving these problems in which n driver chips (which are equivalent to the image signal line driver circuits) that can respectively output pixel signals (the image signals) to the next stage are cascade-connected together. Moreover, Japanese Patent Application Laid-Open Publication No. 2006-330029, for example, discloses a configuration in which a plurality of display driver devices (which are equivalent to the image signal line driver circuits) that can respectively output a plurality of signals to the next stage via a plurality of transmission paths are cascade-connected together. In these conventional configurations, cascade-connecting a plurality of image signal line driver circuits together makes it possible to form a large number of image signal line driver circuits while only using a small number of signal lines.

RELATED ART DOCUMENTS

Patent Documents

Patent Document 1: Japanese Patent Application Laid-Open Publication No. 2006-30949
Patent Document 2: Japanese Patent Application Laid-Open Publication No. 2006-330029

SUMMARY OF THE INVENTION

Problems to be Solved by the Invention

However, neither Japanese Patent Application Laid-Open Publication No. 2006-30949 nor Japanese Patent Application Laid-Open Publication No. 2006-330029 disclose image signal transmission configurations that take factors such as electromagnetic interference (EMI) or the magnitude of heat generation and power consumption resulting from the positioning of the driver circuits into account. In other words, common configurations that include either of the conventional configurations described above tend to exhibit increased heat generation and power consumption due to all of the image signals being transmitted between the cascade-connected driver circuits and also tend to exhibit increased EMI due to the same image signals being transmitted between each of the driver circuits.

Therefore, the present invention aims to provide a display device and a display method that, by transmitting signals in a way that takes the positioning of and connections between a plurality of cascade-connected image signal line driver circuits into account, make it possible to reduce heat generation and power consumption in each driver circuit and/or make it possible to reduce EMI therebetween.

Means for Solving the Problems

A first aspect of the present invention is a display device that displays images via a plurality of pixel formation regions arranged along a plurality of image signal lines for transmitting a plurality of image signals and along a plurality of scanning signal lines that intersect with the plurality of image signal lines, the display device including:

a plurality of image signal line driver circuits that drive, in accordance with image signals representing the images, the plurality of image signal lines, each of the image signal line driver circuits driving a subset of the plurality of image signal lines assigned thereto, the plurality of image signal line driver circuits being grouped into one or more of circuit groups;

a scanning signal line driver circuit that selectively drives the plurality of scanning signal lines; and a display control circuit that provides, to each circuit group of the plurality of image signal line driver circuits, data signals corresponding to the image signals to be provided to the image signal line driver circuits in the circuit group, the data signals being provided by the display control circuit to only one of the image signal line driver circuits in the circuit group, wherein the image signal line driver circuits in each circuit group are:

a first-stage driver circuit that receives the data signals from the display control circuit; and one or more later-stage driver circuits that are cascade-connected in order one-by-one after the first-stage driver circuit, wherein the first-stage driver circuit provides to a second-stage driver circuit connected immediately downstream thereto only a portion of the data signals that is to be used in the one or more later-stage driver circuits in the circuit group, and wherein, when there are two or more of the later-stage driver circuits in the circuit group, each of the two or more later-stage driver circuits, except a last-stage driver circuit in the circuit group, provides, to a next-stage driver circuit that is immediately downstream thereof, only a portion of the data signals that is to be used in the next-stage driver circuit and further downstream later-stage driver circuits, if any.

A second aspect of the present invention is the display device according to the first aspect, wherein in each circuit group, each of the image signal line driver circuits, except the last-stage driver circuit, provides, to a next-stage drive circuit connected immediately downstream thereto, a portion of the data signals such that a phase of the portion of the data signals provided to the next-stage driver circuit is shifted from a phase of a corresponding portion of the data signals received by the image signal line driver circuit.

A third aspect of the present invention is the display device according to the first aspect, wherein with respect to each circuit group, among the data signals and the portions of the data signals that are provided between the display control circuit and a last-stage driver circuit in the circuit group, data signals or portions thereof that are transmitted via signal lines that exhibit relatively higher transmission loss are set to have a relatively greater amplitude than data signals or portions thereof that are transmitted via signal lines that exhibit relatively lower transmission loss.

A fourth aspect of the present invention is the display device according to the first aspect, wherein in each circuit group, the image signal line driver circuits are arranged in a series such that a last-stage driver circuit is arranged between the first-stage driver circuit and the second-stage driver circuit.

A fifth aspect of the present invention is the display device according to the first aspect, wherein the plurality of image signal line driver circuits are disposed along a line, and are grouped into two circuit groups that are arranged side-by-side, and wherein the respective two first-stage driving circuits of the two circuit groups are disposed on respective outer ends of the line along which the plurality of image signal line driver circuits are disposed.

A sixth aspect of the present invention is the display device according to the fifth aspect, wherein the respective second driver circuits are disposed on respective innermost sides of the two groups.

A seventh aspect of the present invention is the display device according to the first aspect,
wherein in each circuit group, the cascade-connection of the image signal line driver circuits is switchable between two different connection schemes, and
wherein the display control circuit alternately switches between the two connection schemes at a prescribed time interval.

An eighth aspect of the present invention is the display device according to the seventh aspect, wherein an order of connection from the first-stage driver circuit to the last-stage driver circuit is reversed between the two connection schemes.

A ninth aspect of the present invention is the display device according to the seventh aspect, wherein the prescribed time interval is a period of one or more frames for displaying the images.

A tenth aspect of the present invention is the display device according to the seventh aspect, wherein the prescribed time interval is a multiple of one or more of a period during which one of the scanning signal lines is selectively driven by the scanning signal line driver circuit.

An eleventh aspect of the present invention is the display device according to the first aspect,
wherein the display control circuit provides, to the first-stage driver circuit of each circuit group, detection signals that include order data indicating a cascade-connection order from the first-stage driver circuit to a last-stage driver circuit in the circuit group,
wherein in each circuit group, the first-stage driver circuit processes the order data to determine that the first-stage driver circuit is at a first stage in the cascade connection, and provides, to the second-stage driver circuit, only a portion of the detection signals that includes order data indicating ordinal positions of 2 or greater, to be processed by the one or more later-stage driver circuits in the circuit group, and
wherein, when there are two or more of the later-stage driver circuits, each of the later-stage driver circuits except a last-stage driver circuit, provides, to a next-stage driver circuit that is immediately downstream thereof, only a portion of the detection signals to be processed by the next-stage driver circuit and further downstream later-stage driver circuits if any.

A twelfth aspect of the present invention is a display method for displaying images via a plurality of pixel formation regions arranged along a plurality of image signal lines for transmitting a plurality of image signals and along a plurality of scanning signal lines that intersect with the plurality of image signal lines, the display method including:
an image signal line driving step of driving the plurality of image signal lines in accordance with image signals representing the images via a plurality of image signal line driving circuits that drive the plurality of image signal lines, each of the image signal line driver circuits driving a subset of the plurality of image signal lines assigned thereto, the plurality of image signal line driver circuits being grouped into one or more of circuit groups,
a scanning signal line driving step of selectively driving the plurality of scanning signal lines; and
a display control step of providing, to each circuit group of the plurality of image signal line driver circuits, data signals corresponding to the image signals to be provided to the image signal line driver circuits in the circuit group, the data signals being provided to only one of the image signal line driver circuits in the circuit group,
wherein the plurality of image signal line driver circuits in each circuit group are:
a first-stage driver circuit that receives the data signal from the display control circuit; and
one or more later-stage driver circuits that are cascade-connected in order one-by-one after the first-stage driver circuit,
wherein the method further includes, with respect to each circuit group:
causing the first-stage driver circuit to provide to a second-stage driver circuit connected immediately downstream thereto only a portion of the data signals that is to be used in the one or more later-stage driver circuits in the circuit group; and
when there are two or more of the later-stage driver circuits in the circuit group, causing each of the two or more the later-stage driver circuits, except a last-stage driver circuit, in the circuit group to provide, to a next-stage driver circuit that is immediately downstream thereof, only a portion of the data signals that is to be used in the next-stage driver circuit and further downstream later-stage driver circuits, if any.

Effects of the Invention

In the first aspect of the present invention, the plurality of image signal line driver circuits are cascade-connected, and the data signal output duration decreases (that is, the amount of output data decreases) moving from the first-stage driver circuit towards the last-stage driver circuit. This makes it possible to reduce power consumption and heat generation in the overall device.

In the second aspect of the present invention, the phases of the data signals that are transmitted between the image signal line driver circuits are shifted relative to one another. This makes it possible to prevent the high-frequency components that grow in magnitude when the data signals rise or fall, for example, from overlapping, thereby making it possible to reduce the effects of electromagnetic interference (EMI).

In the third aspect of the present invention, setting the amplitude of the data signals transmitted via transmission paths with high transmission loss to be greater than the amplitude of the data signals transmitted via transmission paths with low transmission loss makes it possible to reduce transmission errors and also makes it possible to reduce the power consumption and heat generation of the overall device.

The fourth aspect of the present invention makes it possible to arrange the next-stage driver circuits that are immediately downstream of the first-stage driver circuits (which generate the largest amount of heat) far away from those first-stage driver circuits. Moreover, arranging the last-stage driver circuits (which generate the least amount of heat) between those first- and next-stage driver circuits prevents the driver circuits that generate large amounts of heat from being arranged adjacent to or near one another, thereby making it possible to reduce the effects of heat from adjacent driver circuits (that is, heat interference).

In the fifth aspect of the present invention, the first-stage driver circuits (which transmit the largest amounts of data) are arranged at the positions on either end of the image signal line driver circuits, which are arranged in a series. These end positions are only adjacent to another driver circuit on one side, are typically located along the edges of the display panel where there is little interference from other components, and offer high heat dissipation efficiency. This makes it possible to reduce the effects of heat from the driver circuits in the overall device.

The sixth aspect of the present invention makes it possible to arrange the next-stage driver circuits that are immediately downstream of the first-stage driver circuits (which generate the largest amount of heat) far away from those first-stage driver circuits while maintaining high heat dissipation efficiency for the first-stage driver circuits. This prevents the driver circuits that generate large amounts of heat from being arranged adjacent to or near one another, thereby making it possible to reduce the effects of heat from adjacent driver circuits (that is, heat interference).

In the seventh aspect of the present invention, by considering factors such as the positions that exhibit high heat dissipation due to the presence of radiating units or the like as well as the positions that exhibit lower heat dissipation due to being near a heat source such as a power supply circuit or elsewhere, the connections between the driver circuits can be configured to achieve a heat generation pattern (heat distribution) that offers design advantages in terms of dissipating heat, thereby making it possible to reduce the effects of heat from the driver circuits in the overall device.

In the eighth aspect of the present invention, the order in which the first- to last-stage driver circuits are connected is switched to the opposite order at a prescribed time interval, which substantially equalizes the amounts of heat generated by each driver circuit and prevents increased heat generation in any one location, thereby making it possible to reduce the effects of heat from the driver circuits in the overall device.

In the ninth aspect of the present invention, the order in which the first- to last-stage driver circuits are connected is switched to the opposite order every one or more frames. When the order is switched every frame, for example, the amounts of heat generated by each driver circuit are substantially equalized over each two-frame period, thereby preventing increased heat generation in any one location and making it possible to reduce the effects of heat from the driver circuits in the overall device.

In the tenth aspect of the present invention, the order in which the first- to last-stage driver circuits are connected is switched to the opposite order every one or more line selection periods. When the order is switched every one line selection period, for example, the amounts of heat generated by each driver circuit are substantially equalized over each two line selection periods, thereby preventing increased heat generation in any one location and making it possible to reduce the effects of heat from the driver circuits in the overall device.

The eleventh aspect of the present invention makes it possible to easily configure the initial cascade-connection order of the driver circuits. Therefore, unlike in conventional configurations that include a plurality of external terminals for configuring the initial settings, these external terminals can be omitted, thereby making it possible to make (the IC packages of) the circuits smaller and also making it possible to reduce production costs. Moreover, unlike in such conventional configurations, the number of cascade connections is not limited by the number of external terminals, and therefore an extremely large number of driver circuits can be cascade-connected.

The twelfth aspect of the present invention makes it possible to provide a display method that achieves the same effects as in the first aspect.

DETAILED DESCRIPTION OF EMBODIMENTS

Next, embodiments of the present invention will be described with reference to the attached drawings.

1. Embodiment 1

1.1 Overall Configuration and Operation of Liquid Crystal Display Device

Figure 1:
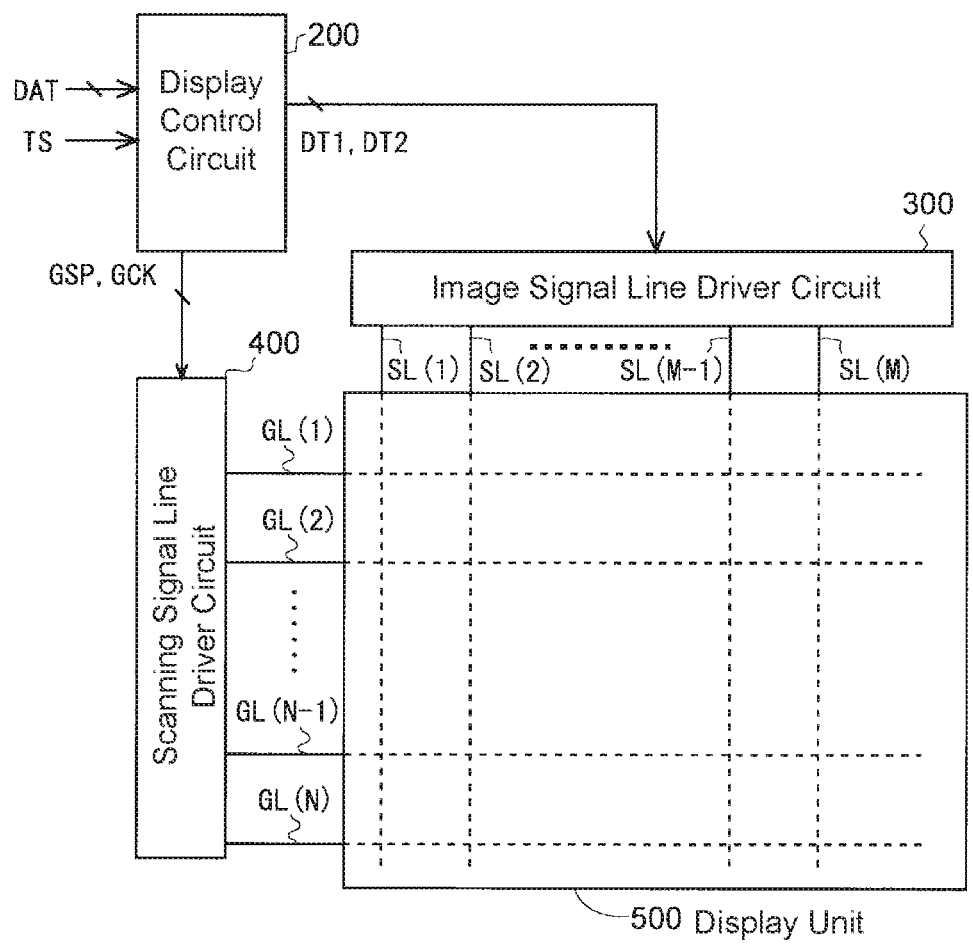
FIG. 1 is a block diagram illustrating an overall configuration of an active-matrix liquid crystal display device according to Embodiment 1 of the present invention.
Figure 2:
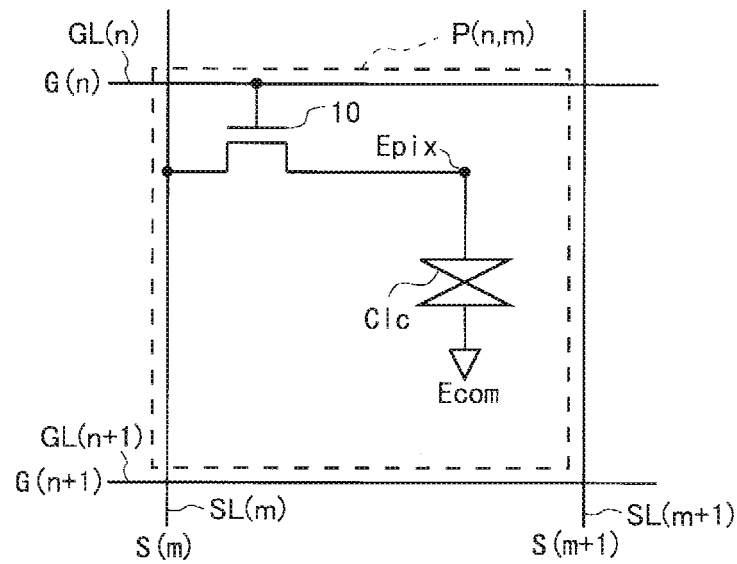
FIG. 2 is a circuit diagram illustrating an equivalent circuit for a pixel formation region in Embodiment 1.

FIG. 1 is a block diagram illustrating an overall configuration of an active-matrix liquid crystal display device according to Embodiment 1 of the present invention. The liquid crystal display device includes a display control circuit 200, an image signal line driver circuit (source driver) 300, a scanning signal line driver circuit (gate driver) 400, and a display unit 500. The display unit 500 includes a plurality of (M) image signal lines SL(1) to SL(M), a plurality of (N) scanning signal lines GL(1) to GL(N), and a plurality of (M×N) pixel formation regions that are formed along the image signal lines SL(1) to SL(M) and the scanning signal lines GL(1) to GL(N). Note that in the following description, the notation P(n, m) will be used to denote the pixel formation region formed near the intersection (in the figures, to the lower right of the intersection) between the scanning signal line GL(n) and the image signal line SL(m). FIG. 2 illustrates an equivalent circuit for the pixel formation region P(n, m) in the display unit 500 of the present embodiment.

As illustrated in FIG. 2, each pixel formation region P(n, m) includes a TFT (a switching element) 10 in which the gate terminal is connected to the scanning signal line GL(n) and the source terminal is connected to the image signal line SL(m) that passes through the corresponding intersection or to the adjacent image signal line SL(m+1), a pixel electrode Epix that is connected to the drain terminal of the TFT 10, a common electrode Ecom formed in common for all of the pixel formation regions P(i, j) (where i=1 to N and j=1 to M), and a liquid crystal layer that is similarly formed in common for all of the pixel formation regions P(i, j) (where i=1 to N and j=1 to M) and is sandwiched between the pixel electrodes Epix and the common electrode Ecom.

In each pixel formation region P(n, m), a liquid crystal capacitor (also known as a "pixel capacitor") Clc is formed between the pixel electrode Epix and the common electrode Ecom that is arranged facing the pixel electrode Epix with the liquid crystal layer sandwiched therebetween. Each pixel electrode Epix is arranged between two image signal lines SL(m) and SL(m+1), and one of these two image signal lines is connected to the pixel electrode Epix via the TFT 10.

Here, amorphous silicon (which can be produced easily and at low cost) is used for the semiconductor layers in the TFTs 10, but various other well-known materials such as In—Ga—Zn—O (IGZO) oxides and continuous grain silicon can also be used, for example. Moreover, using an In—Ga—Zn—Ox oxide semiconductor for the semiconductor layers makes it possible to achieve a further reduction in power consumption in addition to the effects of the present embodiment.

As illustrated in FIG. 1, the display control circuit 200 receives an externally input display data signal DAT and timing control signal TS and outputs a gate start pulse signal GSP, a gate clock signal GCK, and data signals DT1 and DT2 that include digital image signals and timing signals. Note that here, the image signal line driver circuit 300 does not have the conventional configuration in which a source start pulse signal SSP, a source clock signal SCK, and a latch/strobe signal LS for controlling the timing at which images are displayed on the display unit 500 are received. Instead, the image signal line driver circuit 300 receives the data signals DT1 and DT2, which include signals that are equivalent to these timing signals. The content of these data signals DT1 and DT2 will be described in more detail later.

Here, the externally input display data signal DAT includes 18-bit parallel data constituted by the red display data, green display data, and blue display data (which are each 6-bit values) to be input to each pixel formation region, for example. This data is input to image signal lines corresponding to each color.

The image signal line driver circuit 300 receives the data signals DT1 and DT2 output from the display control circuit 200 and then applies drive image signals S(1) to S(M) to the image signal lines SL(1) to SL(M) in order to charge the pixel capacitors Clc (and auxiliary capacitors) of the pixel formation regions P(n, m) in the display unit 500. Here, the image signal line driver circuit 300 is constituted by a plurality of cascade-connected circuits. This will be described in more detail later.

The scanning signal line driver circuit 400 generates, in accordance with the gate start pulse signal GSP and the gate clock signal GCK output from the display control circuit 200, scanning signals G(1), G(2), G(3), and so on to be applied to the scanning signal lines GL(1) to GL(N) of the display unit 500 in order to sequentially select each of those scanning signal lines once per horizontal scanning period.

The present embodiment utilizes a line inversion driving scheme in which the positive or negative polarity of the voltage applied to the liquid crystal in the pixels is inverted in each row in the display unit 500 and is also inverted in each frame. Alternatively, however, a line inversion driving scheme in which the polarity is only inverted in each frame may be used, or a dot inversion driving scheme in which the polarity is inverted in each pixel may be used.

To implement this line inversion driving scheme, the present embodiment includes a common electrode driver circuit (not illustrated in the figures) that inverts, in each frame, the polarity of a common voltage Vcom to be applied to the liquid crystal via the common electrode. The common electrode driver circuit also changes the voltage of the common electrode using an AC drive scheme in order to reduce the amplitude of the voltage applied to the image signal lines. In other words, the common electrode driver circuit generates, in accordance with a polarity inversion signal from the display control circuit 200, a voltage that alternates between two reference voltages in each row and in each frame and then supplies this voltage to the common electrode of the display unit 500 as the common voltage Vcom. This configuration makes it possible to implement the line inversion driving scheme described above.

In this way, drive image signals are applied to the image signal lines SL(1) to SL(M) and scanning signals are sequentially applied to the scanning signal lines GL(1) to GL(N) in order to display images on the display unit 500. Next, the configuration and operation of the image signal line driver circuit 300 will be described with reference to FIGS. 3 to 5.

1.2 Configuration and Operation of Image Signal Line Driver Circuit

Figure 3:
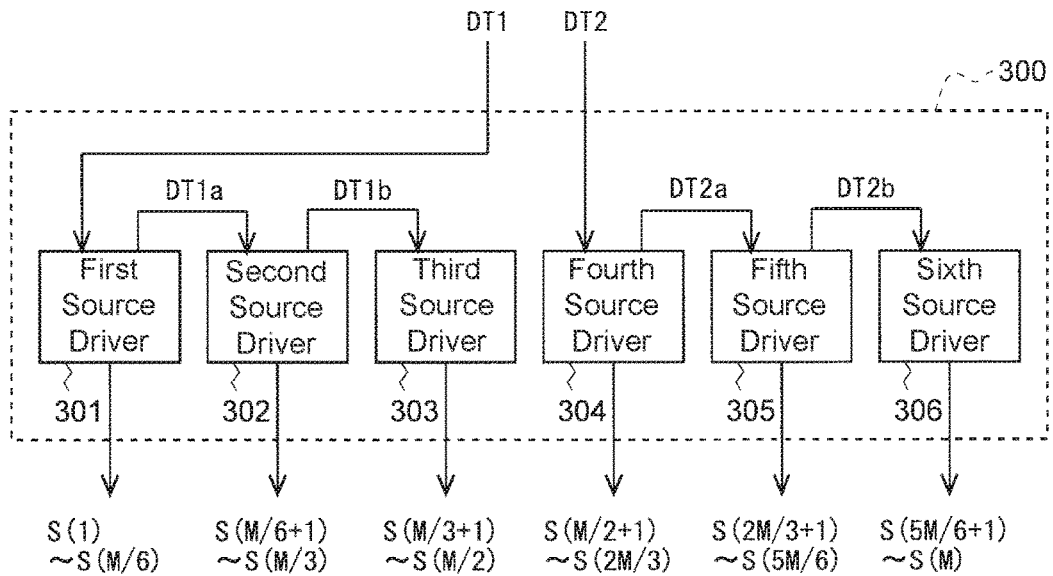
FIG. 3 is a block diagram illustrating a configuration of an image signal line driver circuit in Embodiment 1.

FIG. 3 is a block diagram illustrating a detailed configuration of the image signal line driver circuit 300 in the present embodiment. In the image signal line driver circuit 300 illustrated in FIG. 3, three source drivers (first to third source drivers) 301 to 303 are cascade-connected together, and another three source drivers (fourth to sixth source drivers) 304 to 306 are separately cascade-connected together. Note that in the present embodiment, "cascade-connected" refers to the connection scheme illustrated in FIG. 3, in which a plurality of source drivers are daisy-chained together such that one source driver is connected to an other source driver and then yet another source driver is connected to that other source driver, such that the data input to the first source driver is sequentially relayed to each directly connected downstream source driver one by one.

As the source driver in the first stage of the three cascade-connected source drivers, the first source driver 301 receives the data signal DT1 output from the display control circuit 200, applies drive image signals S(1) to S(M/6) to the image signal lines SL(1) to SL(M/6) in accordance with timing signals and pixel data included in the data signal DT1, and then inputs a data signal DT1a that includes the pixel data other than the pixel data corresponding to these image signal lines to the second source driver 302.

As the source driver in the next stage after the first stage, the second source driver 302 receives the data signal DT1a output from the first source driver 301, applies drive image signals S(M/6+1) to S(M/3) to the image signal lines SL(M/6+1) to SL(M/3) in accordance with timing signals and pixel data included in the data signal DT1a, and then inputs a data signal DT1b that includes the pixel data other than the pixel data corresponding to these image signal lines to the third source driver 303.

As the source driver in the last stage of the three cascade-connected source drivers, the third source driver 303 receives the data signal DT1b output from the second source driver 302 and then applies drive image signals S(M/3+1) to S(M/2) to the image signal lines SL(M/3+1) to SL(M/2) in accordance with timing signals and pixel data included in the data signal DT1b.

The configuration and operation of the fourth to sixth source drivers 304 to 306 are the same as in the first to third source drivers 301 to 303 except in that the drive signal lines to which the drive image signals are applied are different (for the left half versus the right half of the screen). In other words, the pixel data included in the data signal DT1 output from the display control circuit 200 corresponds to the pixels on the left half of the screen and to the drive image signals S(1) to S(M/2), while the pixel data included in the data signal DT2 corresponds to the pixels on the right half of the screen and to the drive image signals S(M/2+1) to S(M). After receiving the pixel data in the manner described above, these six cascade-connected first to sixth source drivers 301 to 306 all drive the respective image signal lines SL(1) to SL(M) at the same prescribed time. This driving scheme is known as a line-sequential driving scheme.

Next, the configuration of the first source driver 301 of the first to sixth source drivers 301 to 306 will be described in detail with reference to FIG. 4. The second to sixth source drivers 302 to 306 have the same configuration as the first source driver 301, and therefore redundant descriptions of these configurations will be omitted here.

Figure 4:
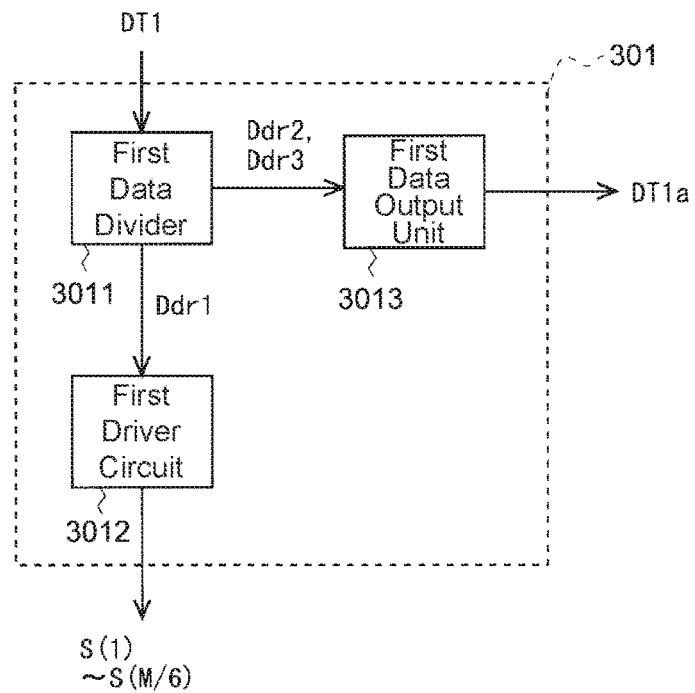
FIG. 4 is a block diagram illustrating a configuration of a first source driver in Embodiment 1.

FIG. 4 is a block diagram illustrating the detailed configuration of the first source driver 301. The first source driver 301 includes a first data divider 3011 that receives the data signal DT1 output from the display control circuit 200 and divides the included pixel data into two sets, a first driver circuit 3012 that outputs the drive image signals S(1) to S(M/6), and a first data output unit 3013 that outputs the data signal DT1a.

The first data divider 3011 receives the data signal DT1 output from the display control circuit 200 and outputs, in accordance with the timing signals and pixel data included in the data signal DT1, pixel data Ddr1 corresponding to the drive image signals S(1) to S(M/6) as well as other pixel data Ddr2 and Ddr3. The pixel data Ddr1 is input to the first driver circuit 3012, and the pixel data Ddr2 and Ddr3 is input to the first data output unit 3013. Here, the pixel data included in the data signal DT1 is the pixel data corresponding to the drive image signals S(1) to S(M/2), and therefore the pixel data Ddr2 and Ddr3 is the data corresponding to the drive image signals S(M/6+1) to S(M/2).

More specifically, the first data divider 3011 includes a memory that stores a portion of the received pixel data, a determination unit that determines whether the pixel data stored in the memory should be included in the pixel data Ddr1 or in the pixel data Ddr2 and Ddr3, and a divider that outputs the pixel data stored in the memory to the first driver circuit 3012 or to the first data output unit 3013 in accordance with the determination result from the determination unit. Circuits for implementing this type of data division are a well-known technology, and various circuit configurations can be used.

The first driver circuit 3012 receives the pixel data Ddr1 from the first data divider 3011 and then outputs the drive image signals S(1) to S(M/6) to the image signal lines SL(1) to SL(M/6) all at the same prescribed time.

More specifically, the first driver circuit 3012 includes a shift register circuit that receives the pixel data Ddr1 and the timing signal and then outputs a prescribed sampling pulse, a data latch circuit that receives the pixel data Ddr1 and the sampling pulse and latches data that represents the pixel values included in the digital image signals, a level shifter circuit that shifts the voltages of the data latched by the data latch circuit, a D/A converter circuit that converts the voltage-shifted digital data from the level shifter circuit to analog voltage signals, and an output buffer circuit for applying the analog voltage signals from the D/A converter circuit to the corresponding image signal lines. These components are the same as the components in conventional image signal line driver circuits and are used to implement a line-sequential driving scheme.

As described above, the third and sixth source drivers 303 and 306 have the same configuration as the first source driver 301, but the first data divider 3011 and the first data output unit 3013 illustrated in FIG. 4 are not needed because the third and sixth source drivers are the last stages in the respective groups of cascade-connected source drivers. Therefore, it is preferable that these components not be included in the third and sixth source drivers. For simplicity, however, a description of the resulting configuration will be omitted here.

Next, the characteristic configurations of data signals DT1, DT2, DT1a, DT1b, DT2a, and DT2b that are input to the corresponding source drivers among the first to third source drivers 301 to 303 and the fourth to sixth source drivers 304 to 306 (which are respectively cascade-connected as illustrated in FIG. 3) will be described with reference to FIG. 5.

Figure 5:
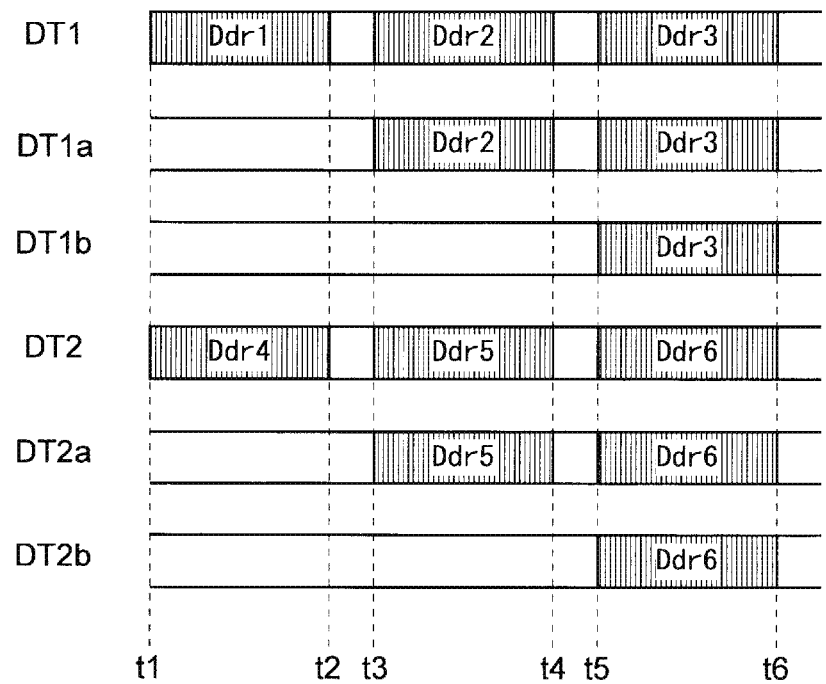
FIG. 5 illustrates pixel data included in data signals as well as the ordering of that pixel data in Embodiment 1.

FIG. 5 illustrates the pixel data included in each of the data signals as well as the ordering of that pixel data. As illustrated in FIG. 5, the data signal DT1 is output from the display control circuit 200 at time t1 and includes the pixel data Ddr1 until time t2, includes the pixel data Ddr2 from time t3 to time t4, and includes the pixel data Ddr3 from time t5 to time t6. Similarly, the data signal DT2 output from the display control circuit 200 includes pixel data Ddr4 until time t2, includes pixel data Ddr5 from time t3 to time t4, and includes pixel data Ddr6 from time t5 to time t6. Moreover, the data signal DT1*a* includes the pixel data Ddr2 and Ddr3, while the data signal DT1*b* includes only the pixel data Ddr3. Similarly, the data signal DT2*a* includes the pixel data Ddr5 and Ddr6, while the data signal DT2*b* includes only the pixel data Ddr6.

In FIG. 5, a given set of the same pixel data is depicted as being output at the same point in time, but in reality there is a prescribed time shift between the times at which the data is output. In other words, the phases of the data sets are shifted. Next, this will be described in more detail with reference to FIG. 6.

Figure 6:
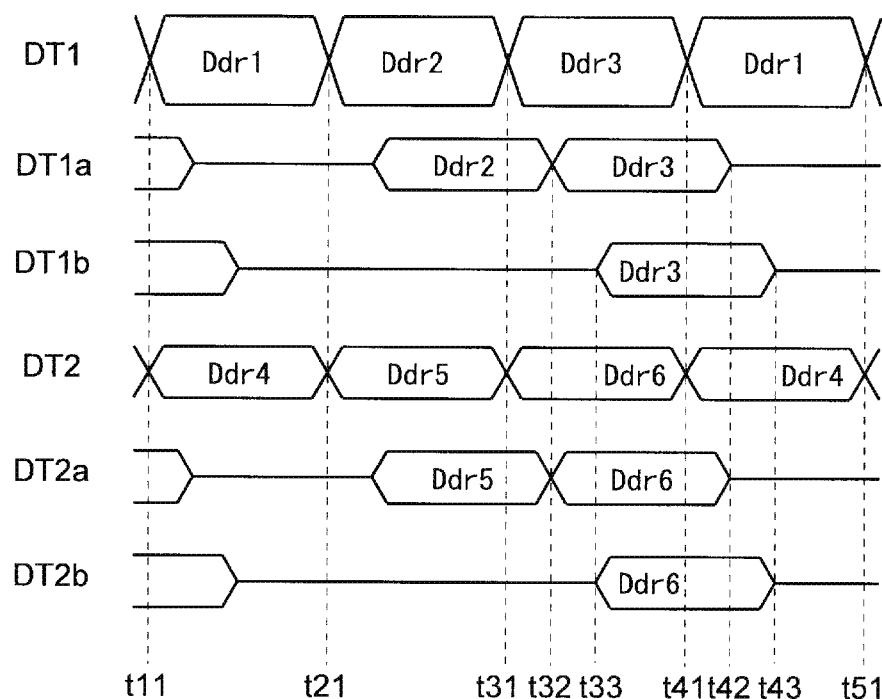
FIG. 6 is a timing chart illustrating data signals in Embodiment 1.

FIG. 6 is a timing chart of the data signals. Consider the third set of pixel data Ddr3 included in the data signal DT1 in FIG. 6, for example. The pixel data Ddr3 included in the data signal DT1 is sent during the period from time t31 to t41, while the pixel data Ddr3 included in the data signal DT1*a* is sent during the period from time t32 to t42, and the pixel data Ddr3 included in the data signal DT1*b* is sent during the period from time t33 to t43.

In this way, even if the phases of the data sets are originally aligned within the data signals DT1, DT1*a*, and DT1*b* and within the data signals DT2, DT2*a*, and DT2*b*, the phases of the data signals get shifted as described above when sent between the cascade-connected source drivers. Shifting the phases of the data signals in this manner makes it possible to prevent the high-frequency components that grow in magnitude when the data signals rise or fall from overlapping, thereby making it possible to reduce the effects of electromagnetic interference (EMI). Moreover, although it is preferable that only the phases of the data signals for which the transmission paths (or the drivers that output the signals) are near one another be shifted, a configuration in which the phases of the data signals are all intentionally shifted may also be used.

Furthermore, as illustrated in FIG. 6, the amplitude of the data signal DT1 is set to be larger than the amplitude of the other data signals. This configuration makes it possible to reduce transmission errors that would otherwise occur on the long transmission path for the data signal DT1 as illustrated in FIG. 3, for example. Meanwhile, setting the amplitudes of the other data signals to smaller values makes it possible to reduce the power consumption of the overall device and also makes it possible to reduce the heat generation of the overall device. Moreover, the transmission paths between the source drivers are extremely short, and therefore reducing the amplitudes of those other data signals that are sent does not result in an increase in transmission errors.

In some cases, shorter transmission paths for the data signals may exhibit greater transmission loss than longer transmission paths. This happens, for example, when low-transmission loss cables such as FPC cables are used for long transmission paths and metal wires made of ITO or the like and formed on a glass substrate are used for short transmission paths. In this case, instead increasing the amplitude of the data signals transmitted via the shorter transmission paths makes it possible to reduce transmission errors. In this way, setting the amplitude of the data signals transmitted via transmission paths with high transmission loss to be greater than the amplitude of the data signals transmitted via transmission paths with low transmission loss makes it possible to reduce transmission errors and also makes it possible to reduce the power consumption and heat generation of the overall device.

Furthermore, as illustrated in FIG. 6, pixel data that is not needed by the source drivers that are connected further downstream is not sent to the source driver in the next stage. More specifically, while the first data divider 3011 illustrated in FIG. 4 is inputting the pixel data Ddr1 to the first driver circuit 3012, the first data output unit 3013 does not output the data signal DT1*a*. Therefore, the source drivers that are connected further downstream utilize increasingly short drive times, thereby reducing the power consumption and heat generation of the overall device.

Note that although the present embodiment includes two groups (two series) of cascade-connected source drivers (the first to third source drivers 301 to 303 and the fourth to sixth source drivers 304 to 306), neither the number of source drivers nor the number of cascade-connected groups (series) is particularly limited.

1.3 Effects

In the present embodiment as described above, the output duration of the data signals that are input to the cascade-connected source driver groups (such as the first to third source drivers 301 to 303) included in the image signal line driver circuit 300 is increasingly short on the source drivers that are connected further downstream, thereby making it possible to reduce the power consumption and heat generation of the overall device.

2. Embodiment 2

2.1 Overall Configuration and Operation of Liquid Crystal Display Device

An active-matrix liquid crystal display device according to the present embodiment has the same configuration and operates in the same manner as the display device according to Embodiment 1 and illustrated in FIG. 1 except for the connections between the source drivers in the image signal line driver circuit 300 and the content of the data signals. Therefore, the same reference characters will be used for components that are the same, and redundant descriptions of such components will be omitted here.

2.2 Configuration and Operation of Image Signal Line Driver Circuit

Figure 7:
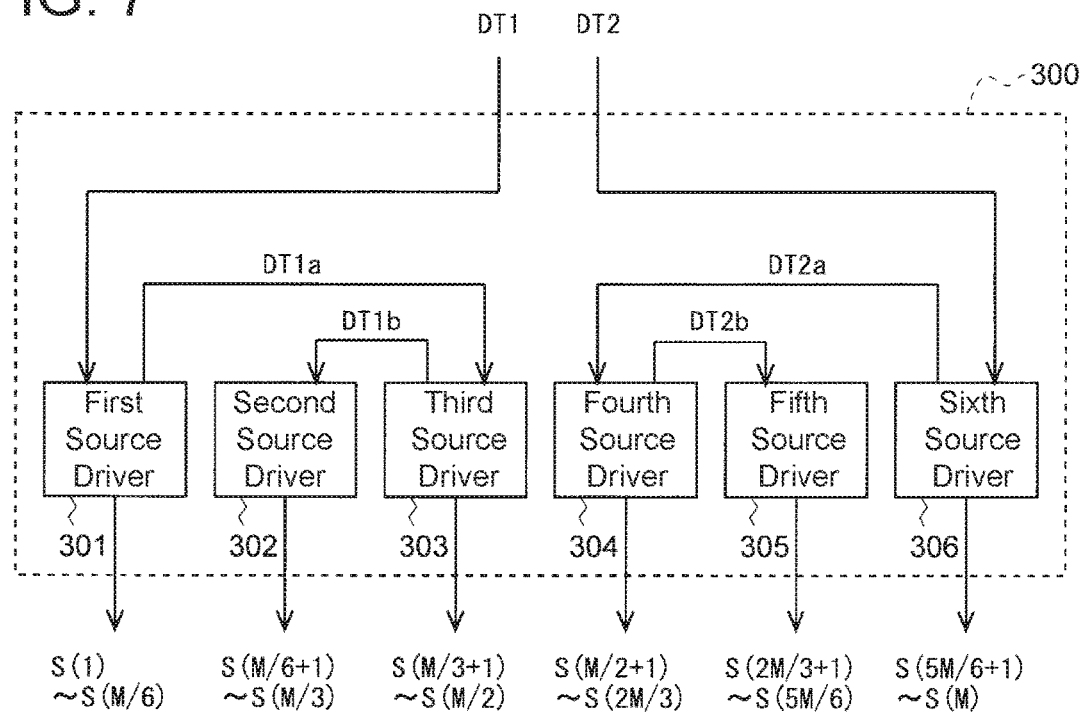
FIG. 7 is a block diagram illustrating a configuration of an image signal line driver circuit in Embodiment 2 of the present invention.

FIG. 7 is a block diagram illustrating a detailed configuration of the image signal line driver circuit 300 in the present embodiment. In the image signal line driver circuit 300 illustrated in FIG. 7, three source drivers (first to third source drivers) 301 to 303 that have the same configuration as in the image signal line driver circuit 300 illustrated in FIG. 3 are cascade-connected together, and another three source drivers (fourth to sixth source drivers) 304 to 306 are separately cascade-connected together.

However, as illustrated in FIG. 7, the order in which the source drivers are cascade-connected is different from in Embodiment 1. In other words, similar to in Embodiment 1, the source driver in the first stage of the cascade-connected first to third source drivers 301 to 303 is the first source driver 301, while unlike in Embodiment 1, the source driver in the next stage is the third source driver 303 and the source driver in the last stage is the second source driver 302. Similarly, the fourth to sixth source drivers 304 to 306 are cascade-connected in a different order than in Embodiment 1, with the sixth source driver 306 being followed by the fourth source driver 304 which is then followed by the fifth source driver 305.

Therefore, the configurations of the data signals DT1, DT2, DT1a, DT1b, DT2a, and DT2b that are input to the corresponding source drivers among the first to third source drivers 301 to 303 and the fourth to sixth source drivers 304 to 306 (which are respectively cascade-connected as illustrated in FIG. 7) are different than the configurations illustrated in FIG. 5. Next, this will be described in more detail with reference to FIG. 8.

Figure 8:
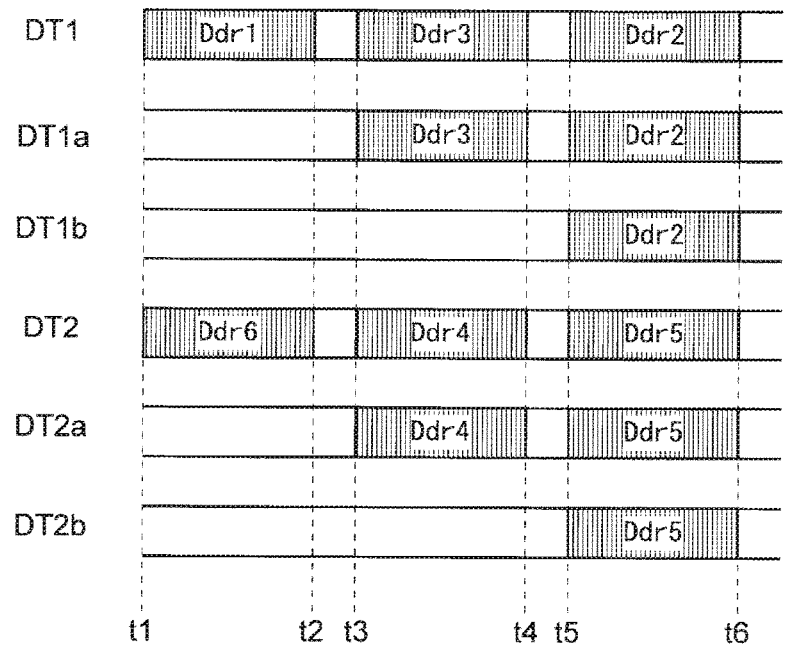
FIG. 8 illustrates an example of pixel data included in data signals as well as the ordering of that pixel data in Embodiment 2.

FIG. 8 illustrates an example of the pixel data included in each of the data signals as well as the ordering of that pixel data. As illustrated in FIG. 8, similar to in Embodiment 1, the data signal DT1 is output from the display control circuit 200 at time t1 and includes the pixel data Ddr1 until time t2, while unlike in Embodiment 1, the data signal DT1 includes the pixel data Ddr3 from time t3 to time t4 and includes the pixel data Ddr2 from time t5 to time t6. Therefore, the configuration of the data is the same as the configuration illustrated in FIG. 5 except in that the pixel data Ddr2 and the pixel data Ddr3 are switched in order. The configuration of the data signals DT2, DT2a, and DT2b is also modified.

Changing the ordering of the pixel data included in the data signals DT1 and DT2 that are output from the display control circuit 200 to another order makes it possible to easily input the pixel data to the corresponding source drivers regardless of how the first to third source drivers 301 to 303 and the fourth to sixth source drivers 304 to 306 may potentially be reordered.

However, upon receiving the externally input display data signal DAT, the display control circuit 200 generates the pixel data Ddr1 to Ddr6 in that order. Therefore, when the ordering of the pixel data is changed as described above, the pixel data must be stored in memory and then later reordered as appropriate. This increases the complexity of the configuration and operation of the device. Therefore, driving the device without changing the order of the pixel data makes it possible to simplify the overall configuration. Next, such a configuration will be described with reference to FIG. 9.

Figure 9:
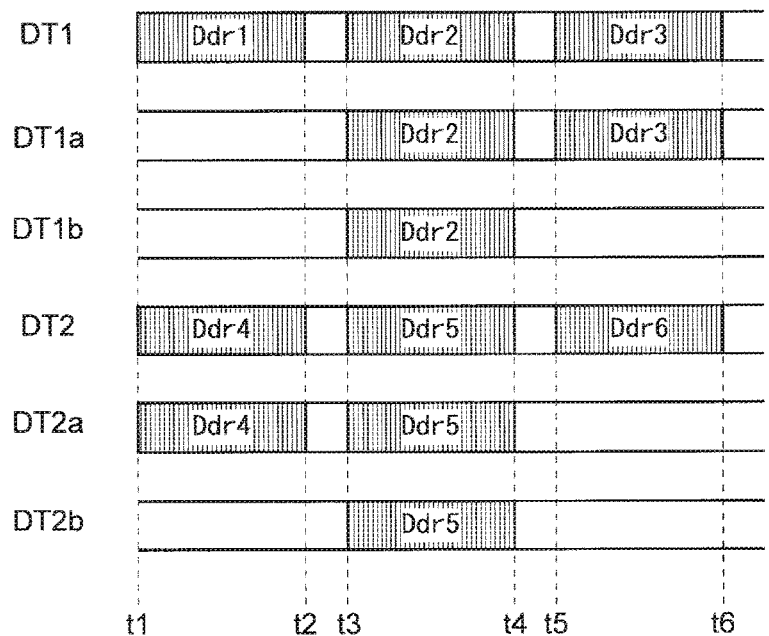
FIG. 9 illustrates another example of pixel data included in data signals as well as the ordering of that pixel data in Embodiment 2.

FIG. 9 illustrates another example of the pixel data included in each of the data signals as well as the ordering of that pixel data. As illustrated in FIG. 9, the data signal DT1a and the data signals DT1 and DT2 output from the display control circuit 200 are the same as in Embodiment 1. The data signal DT1b is different in that it includes only the pixel data Ddr2 during the period from time t3 to t4. The configuration of the data signal DT2b is also different in a similar manner. The data signal DT2a is different in that it includes the pixel data Ddr4 during the period from time t1 to t2 and does not include the pixel data Ddr6 during the period from time t5 to t6.

Configuring the (pixel data included in the) data signals as illustrated in FIG. 9 makes it possible to easily input the pixel data to the corresponding source drivers without changing the ordering of the pixel data included in the data signals DT1 and DT2 and regardless of how the first to third source drivers 301 to 303 and the fourth to sixth source drivers 304 to 306 may potentially be reordered.

In the present embodiment, the reason for cascade-connecting the first to sixth source drivers 301 to 306 in the manner illustrated in FIG. 7 is to increase the efficiency of heat dissipation from the source drivers and to reduce the effects of heat from adjacent source drivers (that is, heat interference).

Moreover, the reason for respectively inputting the data signals DT1 and DT2 from the display control circuit 200 to the first and sixth source drivers 301 and 306 first is because these source drivers are arranged on the edges of the display unit 500 (that is, the liquid crystal panel) and on either end of the line of source drivers. These end positions have only one adjacent source driver (on the inner side) and are also positioned near the edges of the liquid crystal panel, and as a result, these positions experience little interference from other components and also exhibit high heat dissipation efficiency. Therefore, the first-stage source drivers, which transmit the largest amount of data, are arranged at these positions. This makes it possible to reduce the effects of heat from the source drivers in the overall device.

Furthermore, the reason for inputting the data signals with the last-stage source drivers being arranged between the first-stage source drivers and the next downstream source drivers is so that those next downstream source drivers (the third and fourth source drivers 303 and 304) are arranged as far away as possible from the first-stage source drivers (the first and sixth source drivers 301 and 306), which generate the largest amount of heat. In addition, arranging the last-stage source drivers (the second and fifth source drivers 302 and 305), which generate the least amount of heat, between the other source drivers makes it possible to prevent the source drivers that generate larger amounts of heat from being arranged adjacent to or near one another. This configuration reduces the effects of heat from adjacent source drivers (that is, heat interference).

2.3 Effects

The configuration of the present embodiment as described above makes it possible to achieve the same effects as in Embodiment 1. Moreover, in the present embodiment the first-stage source drivers that transmit the largest amount of data are arranged at the positions on either end of the series of source drivers (that is, at the positions near the edges of the liquid crystal panel), thereby making it possible to reduce the effects of heat from the source drivers in the overall device. Furthermore, the source drivers that generate the largest amounts of heat are arranged to not be adjacent to one another, thereby making it possible to reduce the effects of heat from adjacent source drivers (that is, heat interference).

2.4. Modification Examples of Embodiment 2

In Embodiment 2, the first-stage source drivers are arranged at positions near the edges of the liquid crystal panel that exhibit high heat dissipation. However, if positions that offer higher heat dissipation are available in another location due to the presence of well-known radiating units such as radiating fins arranged near the center of the liquid crystal panel, for example, the first-stage source drivers may instead be arranged at those positions that offer higher heat dissipation.

Alternatively, the source drivers in the next stages after the first-stage source drivers or the source drivers that are even further downstream may be arranged in these positions that offer higher heat dissipation. Arranging the source drivers that generate larger amounts of heat in a central location and then forming radiating units at this location makes it possible to reduce the number of radiating units required and to thereby prevent increases in production costs. Moreover, such configurations make it possible to dissipate heat efficiently, thereby making it possible to reduce the effects of heat from the source drivers (that is, heat interference).

In addition, the source drivers that generate lower amounts of heat (such as the last-stage source drivers or the source drivers upstream thereof) may conversely be arranged near a heat source such as a power supply circuit or in other positions that offer lower heat dissipation. This makes it possible to reduce the effects of heat from the source drivers in the overall device.

3. Embodiment 3

3.1 Overall Configuration and Operation of Liquid Crystal Display Device

An active-matrix liquid crystal display device according to the present embodiment has the same configuration and operates in the same manner as the display device according to Embodiment 1 and illustrated in FIG. 1 except for the connections between the source drivers in the image signal line driver circuit 300 and the content of the data signals. Therefore, the same reference characters will be used for components that are the same, and redundant descriptions of such components will be omitted here.

3.2 Configuration and Operation of Image Signal Line Driver Circuit

Figure 10:
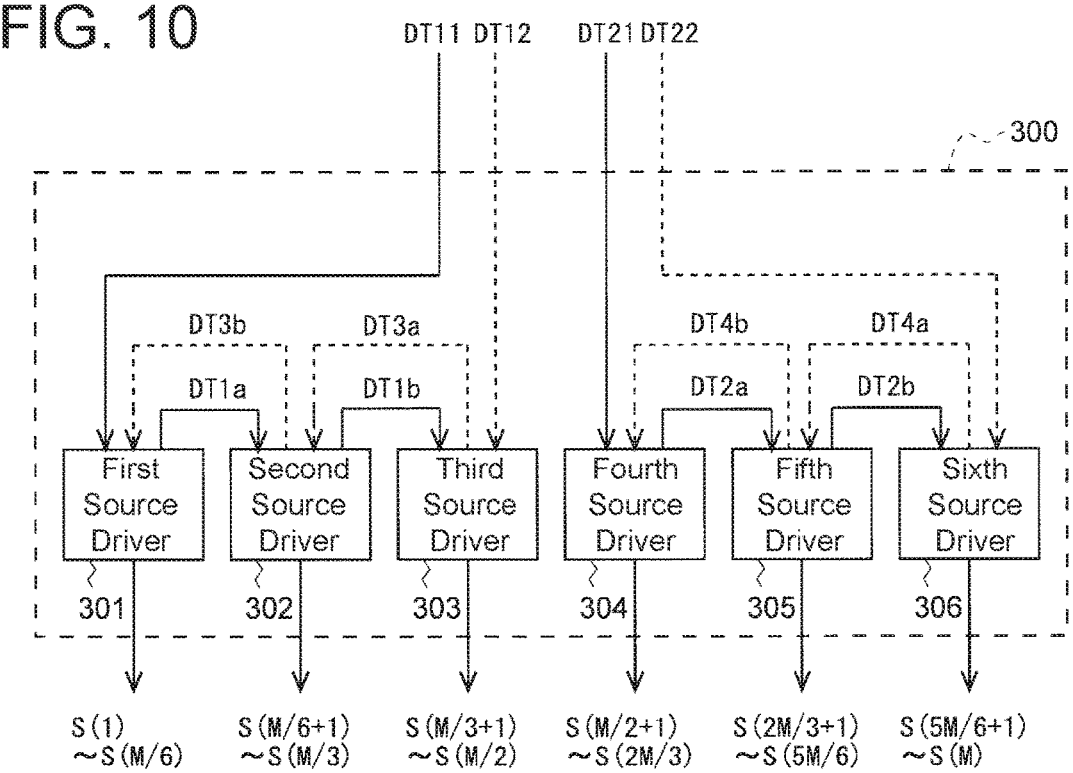
FIG. 10 is a block diagram illustrating a configuration of an image signal line driver circuit in Embodiment 3 of the present invention.

FIG. 10 is a block diagram illustrating a detailed configuration of the image signal line driver circuit 300 in the present embodiment. In the image signal line driver circuit 300 illustrated in FIG. 10, three source drivers (first to third source drivers) 301 to 303 that have the same configuration as in the image signal line driver circuit 300 illustrated in FIG. 3 are cascade-connected together, and another three source drivers (fourth to sixth source drivers) 304 to 306 are separately cascade-connected together.

However, unlike in Embodiment 1, this configuration alternately switches between two connection schemes: one cascade connection that runs in the same order as in Embodiment 1 (illustrated by the solid line in FIG. 10), and one cascade connection that runs in the opposite order as in Embodiment 1 (illustrated by the dashed line).

In other words, when the first-stage source driver of the cascade-connected first to third source drivers 301 to 303 is the first source driver 301 (that is, when a data signal DT11 that is the same as the data signal DT1 is input to the first source driver 301), the configuration operates the same as in Embodiment 1. However, when the first-stage source driver is the third source driver 303 (that is, when a data signal DT12 that is the same as the data signal DT1 is input to the third source driver 303), the configuration operates differently than in Embodiment 1 because the source drivers are cascade-connected in the opposite order as in Embodiment 1. This will be described in more detail later.

Similarly, when the first-stage source driver of the cascade-connected fourth to sixth source drivers 304 to 306 is the fourth source driver 304 (that is, when a data signal DT21 that is the same as the data signal DT2 is input to the fourth source driver 304), the configuration operates the same as in Embodiment 1. However, when the first-stage source driver is the sixth source driver 306 (that is, when a data signal DT22 that is the same as the data signal DT2 is input to the sixth source driver 306), the configuration operates differently than in Embodiment 1 because the source drivers are cascade-connected in the opposite order as in Embodiment 1.

Therefore, the configurations of the data signals DT11, DT21, DT1$a$, DT1$b$, DT2$a$, and DT2$b$ that are input to the corresponding source drivers among the first to third source drivers 301 to 303 and the fourth to sixth source drivers 304 to 306 (which are respectively cascade-connected in the two connection schemes illustrated in FIG. 10) are exactly the same as the configurations illustrated in FIG. 5. Moreover, the data signals DT12 and DT22 are the same as the data signals DT1 and DT2 (and are thus the same as the data signals DT11 and DT21 as well). However, the configurations of data signals DT3$a$, DT3$b$, DT4$a$, and DT4$b$ that are input to the corresponding source drivers among the source drivers listed above are different. Next, this will be described in more detail with reference to FIG. 11.

Figure 11:
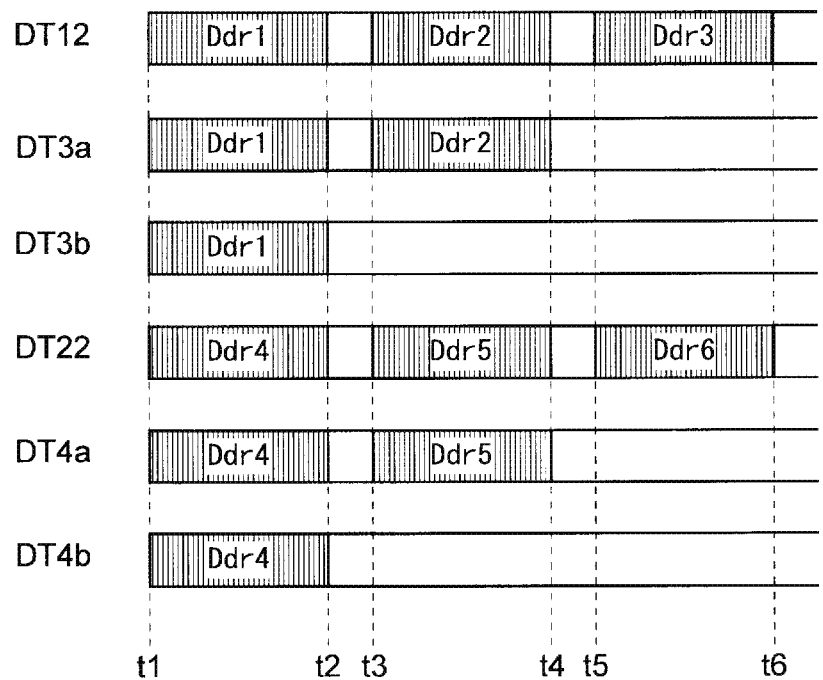
FIG. 11 illustrates pixel data included in data signals as well as the ordering of that pixel data in Embodiment 3.

FIG. 11 illustrates the pixel data included in each of the data signals as well as the ordering of that pixel data. As illustrated in FIG. 11, the data signals DT12 and DT22 that are output from the display control circuit 200 at time t1 are the same as in Embodiment 1, while the data signal DT3$a$ is different than the data signal DT1$a$ in that the pixel data Ddr1 is included during the period from time t1 to t2 and in that the pixel data Ddr3 is not included during the period from time t5 to t6. The data signal DT4$a$ has a similar configuration.

Moreover, the data signal DT3$b$ is different than the data signal DT1$b$ in that the pixel data Ddr1 is included during the period from time t1 to t2 and in that the pixel data Ddr3 is not included during the period from time t5 to t6. The data signal DT4$b$ has a similar configuration.

Furthermore, for convenience, in the present embodiment it is assumed that the wiring corresponding to the respective cascade connections described above is provided separately. Therefore, the first data divider 3011 of the first source driver 301 illustrated in FIG. 4, for example, is configured to be able to receive both the data signal DT11 (which is equivalent to the data signal DT1) and the data signal DT3$b$. Moreover, when receiving the data signal DT3$b$, this source driver is the last stage and only receives the pixel data Ddr1, and therefore the first data output unit 3013 does not output any data signals during this time. In addition, in the present embodiment the output unit of the second source driver 302 not only has to output the data signal DT1$b$ but also has to output the data signal DT3$b$ in the opposite direction, and therefore two output units are required. Here, pixel data that is divided as appropriate by a data divider is respectively input to these two output units.

In this configuration, the source drivers are effectively cascade-connected in the same manner as in Embodiment 1 when the data signal D11 is input to the first source driver 301 and the data signal D21 is input to the fourth source driver 304, while the source drivers are effectively cascade-connected in the opposite direction as in Embodiment 1 when the data signal D12 is input to the third source driver 303 and the data signal D22 is input to the sixth source driver 306. This makes it possible to alternately switch between the two cascade connections simply by switching the data signals that are output from the display control circuit 200 and without having to include additional switching components in the source drivers to control the switching operations.

Although there are two separate cascade-connection schemes, the connections between the individual drivers are the same in both directions, and the direction in which the signals are transmitted is simply reversed. Therefore, the wiring corresponding to the respective cascade connections may be shared in both directions. In this case, although no additional wiring is required, switching units (not illustrated in the figure) are required to switch the inputs and outputs of the source drivers in accordance with the signal transmission direction. Various well-known configurations can be used to implement this type of shared wiring scheme, and therefore a detailed description will be omitted here.

In the present embodiment, the reason for cascade-connecting the first to sixth source drivers 301 to 306 in the two connection schemes with opposite connection orders as illustrated in FIG. 10 is to equalize the amount of heat generated by the source drivers for each individual source driver and to thereby reduce the effects of that heat (that is, heat interference).

In other words, each time the image input to the display device is changed, the display control circuit 200 will output the data signals DT11 and DT21 (typically in even frames) so that the cascade connections are the same as in Embodiment 1, and then the display control circuit 200 will output the data signals DT12 and DT22 (typically in odd frames) so that the cascade connections run in the opposite direction as in Embodiment 1, for example. In this way, the connection order from the first-stage source driver to the last-stage source driver is switched to the opposite order in each frame, and therefore the amounts of heat generated by each source driver are each substantially equalized over each two-frame period. This prevents increased heat generation in any one location, thereby making it possible to reduce the effects of heat from the source drivers in the overall device.

Moreover, although a configuration in which the connection order is switched in every frame was described here, the connection order may alternatively only be switched every two or more frames. This makes the period over which heat generation is equalized longer but also makes it possible to reduce the switching frequency. Alternatively, the connection order may be switched every time a scanning signal line is selected (that is, every line selection period) or may be switched every two or more line selection periods. This makes it possible to make the period over which heat generation is equalized shorter than when the connection order is switched every frame.

3.3 Effects

The configuration of the present embodiment as described above makes it possible to achieve the same effects as in Embodiment 1. Moreover, in the present embodiment the source drivers are cascade-connected in two connection schemes having opposite connection orders. This makes it possible to equalize the amount of heat generated by the source drivers, thereby making it possible to reduce the effects of that heat (that is, heat interference).

3.4. Modification Examples of Embodiment 3

In Embodiment 3, the source drivers are cascade-connected in two connection schemes having opposite connection orders. However, the connection orders do not necessarily have to be exactly opposite, and two completely different connection schemes may be used, or a configuration that switches between three or more cascade connections may be used. In this case, although the amount of heat generated by the source drivers cannot be equalized, configuring the connections between the source drivers appropriately makes it possible to freely set the total amount of heat generated by each source driver over a period of two or more frames.

Therefore, by considering factors such as the positions that exhibit high heat dissipation due to the presence of radiating units or the like as well as the positions that exhibit lower heat dissipation due to being near a heat source such as a power supply circuit or elsewhere (as described in Embodiment 2), the connections between the source drivers can be configured to achieve a heat generation pattern (heat distribution) that offers design advantages in terms of dissipating heat, thereby making it possible to reduce the effects of heat from the source drivers in the overall device.

4. Embodiment 4

4.1 Overall Configuration and Operation of Liquid Crystal Display Device

An active-matrix liquid crystal display device according to the present embodiment has the same configuration and operates in the same manner as the display device according to Embodiment 1 and illustrated in FIG. 1 in terms of the connections between the source drivers in the image signal line driver circuit 300 and the content of the data signals, and is only different in terms of a configuration and operation for detecting the cascade-connection order. Therefore, the same reference characters will be used for components that are the same, and redundant descriptions of such components will be omitted here.

In the present embodiment, when the device is initially configured during manufacturing or on startup or the like, the display control circuit 200 inputs detection signals DET1 and DET2 (which are command signals that are not illustrated in FIG. 1) to the image signal line driver circuit 300 instead of the data signals DT1 and DT2 in order to detect the cascade-connection order. The detection signals DET1 and DET2 each include a plurality of sets of detection data to be input to the source drivers in order, and each set of detection data includes a numerical value that indicates the ordinal position at which that set of detection data is arranged in the respective detection signal. The cascade-connection order of the source drivers can thus be determined on the basis of the numerical values included in these sets of detection data.

For example, the first data divider 3011 in the first source driver 301 illustrated in FIG. 4 analyzes the first set of detection data in the received detection data to determine the ordinal position of that first set of detection data (here, this first set of detection data has an ordinal position of 1) and then inputs the remaining detection data other than this first set of detection data to the first data output unit 3013. Note that here, this first set of detection data is not pixel data and is therefore not input to the first driver circuit 3012.

Next, the first data output unit 3013 outputs the detection data with an ordinal position of 2 as the first set of detection data, and the source driver in the next stage analyzes this first set of received detection data to extract the numerical value included therein and determine that this set of detection data has an ordinal position of 2 (in other words, that this source driver is connected at the second position in the cascade connection). In this way, analyzing the first set of detection data in the detection data that is received in order makes it possible to determine the ordinal position at which the corresponding source driver is connected in the cascade connection.

Figure 12:
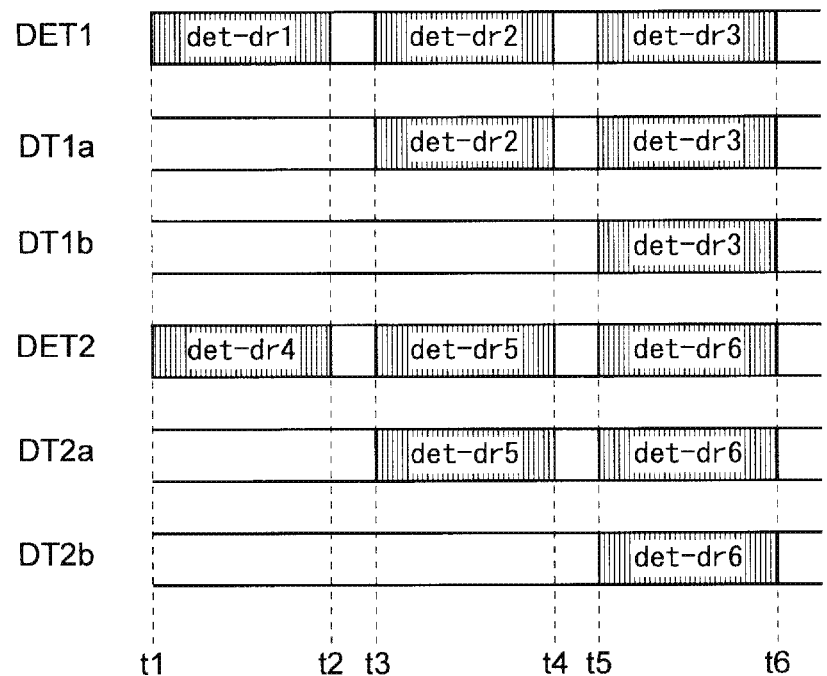
FIG. 12 illustrates detection data included in detection signals as well as the ordering of that detection data in Embodiment 4 of the present invention.

FIG. 12 illustrates the detection data included in the detection signals as well as the ordering of that detection data. As illustrated in FIG. 12, the detection signal DET1 that is output from the display control circuit 200 includes the detection data det-dr1 from time t1 to time t2, includes the detection data det-dr2 from time t3 to time t4, and includes the detection data det-dr3 from time t5 to time t6. Similarly, the detection signal DET2 that is output from the display control circuit 200 includes the detection data det-dr4 from time t1 to time t2, includes the detection data det-dr5 from time t3 to time t4, and includes the detection data det-dr6 from time t5 to time t6. Moreover, the data signal DT1a includes the detection data det-dr2 and det-dr3, while the data signal DT1b includes only the detection data det-dr3. The arrangement of this detection data is thus the same as the arrangement of the pixel data illustrated in FIG. 5.

4.2 Effects

The configuration of the present embodiment as described above makes it possible to achieve the same effects as in Embodiment 1 and also makes it possible to easily configure the initial cascade-connection order of the source drivers. Therefore, unlike in conventional configurations that include a plurality of external terminals for configuring the initial settings, these external terminals can be omitted, thereby making it possible to make (the IC packages of) the source driver circuits smaller and also making it possible to reduce production costs. Moreover, the number of cascade connections is not limited by the number of external terminals, and therefore an extremely large number of source drivers can be cascade-connected.

INDUSTRIAL APPLICABILITY

The present display device makes it possible to reduce EMI and/or to reduce the heat generation and power consumption of the overall device and can therefore be applied to any type of display device.

DESCRIPTION OF REFERENCE CHARACTERS 10 thin-film transistor (TFT)
200 display control circuit
300 image signal line driver circuit
301 to 306 first to sixth source driver
400 scanning signal line driver circuit
500 display unit
3011 first data divider
3012 first driver circuit
3013 first data output unit
P(n, m) pixel formation region (pixel)
Epix pixel electrode
Ecom common electrode (counter electrode)
G(i) scanning signal (i=1, 2, 3, . . . )
GL(i) scanning signal line (i=1, 2, 3, . . . )
S(j) drive image signal (j=1, 2, 3, . . . )
SL(j) image signal line (j=1, 2, 3, . . . )
DT1, DT2 data signal

What is claimed is:

1. A display device that displays images via a plurality of pixel formation regions arranged along a plurality of image signal lines for transmitting a plurality of image signals and along a plurality of scanning signal lines that intersect with the plurality of image signal lines, the display device comprising:
 a plurality of image signal line driver circuits that drive, in accordance with image signals representing the images, the plurality of image signal lines, each of the image signal line driver circuits driving a subset of the plurality of image signal lines assigned thereto, the plurality of image signal line driver circuits being grouped into one or more of circuit groups;
 a scanning signal line driver circuit that selectively drives the plurality of scanning signal lines; and
 a display control circuit that provides, to each circuit group of the plurality of image signal line driver circuits data signals corresponding to the image signals to be provided to the image signal line driver circuits in the circuit group, said data signals being provided by the display control circuit to only one of the image signal line driver circuits in the circuit group,
 wherein the image signal line driver circuits in each circuit group are:
  a first-stage driver circuit that receives the data signals from the display control circuit; and
  one or more later-stage driver circuits that are cascade-connected in order one-by-one after the first-stage driver circuit,
  wherein the first-stage driver circuit provides to a second-stage driver circuit connected immediately downstream thereto only a portion of the data signals that is to be used in the one or more later-stage driver circuits in the circuit group, and
  wherein, when there are two or more of the later-stage driver circuits in the circuit group, each of the two or more later-stage driver circuits, except a last-stage driver circuit in the circuit group, provides, to a next-stage driver circuit that is immediately downstream thereof, only a portion of the data signals that is to be used in the next-stage driver circuit and further downstream later-stage driver circuits, if any
   wherein in each circuit group, the image signal line driver circuits are arranged in a series such that a last-stage driver circuit is arranged between the first-stage driver circuit and the second-stage driver circuit.

2. The display device according to claim 1, wherein in each circuit group, each of the image signal line driver circuits, except the last-stage driver circuit, provides, to a next-stage drive circuit connected immediately downstream thereto, a portion of the data signals such that a phase of the portion of the data signals provided to the next-stage driver circuit is shifted from a phase of a corresponding portion of the data signals received by the image signal line driver circuit.

3. The display device according to claim 1, wherein with respect to each circuit group, among the data signals and the portions of the data signals that are provided between the display control circuit and a last-stage driver circuit in the circuit group, data signals or portions thereof that are transmitted via signal lines that exhibit relatively higher transmission loss are set to have a relatively greater amplitude than data signals or portions thereof that are transmitted via signal lines that exhibit relatively lower transmission loss.

4. The display device according to claim 1,
 wherein the plurality of image signal line driver circuits are disposed along a line, and are grouped into a first circuit group and a second circuit group that are arranged side-by-side, and
 wherein the first-stage driving circuit of the first circuit group and the first-stage driving circuit of the second circuit group are disposed on respective outer ends of the line along which the plurality of image signal line driver circuits are disposed.

5. The display device according to claim 4, wherein the second stage-driver circuit of the first circuit group and the second-stage driver circuit of the second circuit group are disposed on respective innermost sides of the first circuit group and the second circuit group.

6. The display device according to claim 1,
wherein the display control circuit provides, to the first-stage driver circuit of each circuit group, detection signals that include order data indicating a cascade-connection order from the first-stage driver circuit to a last-stage driver circuit in the circuit group,
wherein in each circuit group, the first-stage driver circuit processes the order data to determine that the first-stage driver circuit is at a first stage in the cascade connection, and provides, to the second-stage driver circuit, only a portion of the detection signals that includes order data indicating ordinal positions of 2 or greater, to be processed by the one or more later-stage driver circuits in the circuit group, and
wherein, when there are two or more of the later-stage driver circuits, each of the later-stage driver circuits, except a last-stage driver circuit, provides, to a next-stage driver circuit that is immediately downstream thereof, only a portion of the detection signals to be processed by the next-stage driver circuit and further downstream later-stage driver circuits, if any.

7. A display device that displays images via a plurality of pixel formation regions arranged along a plurality of image signal lines for transmitting a plurality of image signals and along a plurality of scanning signal lines that intersect with the plurality of image signal lines, the display device comprising:
a plurality of image signal line driver circuits that drive, in accordance with image signals representing the images, the plurality of image signal lines, each of the image signal line driver circuits driving a subset of the plurality of image signal lines assigned thereto, the plurality of image signal line driver circuits being grouped into one or more of circuit groups;
a scanning signal line driver circuit that selectively drives the plurality of scanning signal lines; and
a display control circuit that provides, to each circuit group of the plurality of image signal line driver circuits data signals corresponding to the image signals to be provided to the image signal line driver circuits in the circuit group, said data signals being provided by the display control circuit to only one of the image signal line driver circuits in the circuit group,
wherein the image signal line driver circuits in each circuit group are:
a first-stage driver circuit that receives the data signals from the display control circuit; and
one or more later-stage driver circuits that are cascade-connected in order one-by-one after the first-stage driver circuit,
wherein the first-stage driver circuit provides to a second-stage driver circuit connected immediately downstream thereto only a portion of the data signals that is to be used in the one or more later-stage driver circuits in the circuit group, and
wherein, when there are two or more of the later-stage driver circuits in the circuit group, each of the two or more later-stage driver circuits, except a last-stage driver circuit in the circuit group, provides, to a next-stage driver circuit that is immediately downstream thereof, only a portion of the data signals that is to be used in the next-stage driver circuit and further downstream later-stage driver circuits, if any,
wherein in each circuit group, the cascade-connection of the image signal line driver circuits is switchable between two different connection schemes,
wherein the display control circuit alternately switches between the two connection schemes at a prescribed time interval, and
wherein the prescribed time interval is a multiple of one or more of a period during which one of the scanning signal lines is selectively driven by the scanning signal line driver circuit.

8. The display device according to claim 7, wherein an order of connection from the first-stage driver circuit to the last-stage driver circuit is reversed between the two connection schemes.

9. The display device according to claim 7, wherein the prescribed time interval is a period of one or more frames for displaying the images.

10. The display device according to claim 7, wherein in each circuit group, each of the image signal line driver circuits, except the last-stage driver circuit, provides, to a next-stage drive circuit connected immediately downstream thereto, a portion of the data signals such that a phase of the portion of the data signals provided to the next-stage driver circuit is shifted from a phase of a corresponding portion of the data signals received by the image signal line driver circuit.

11. The display device according to claim 7, wherein with respect to each circuit group, among the data signals and the portions of the data signals that are provided between the display control circuit and a last-stage driver circuit in the circuit group, data signals or portions thereof that are transmitted via signal lines that exhibit relatively higher transmission loss are set to have a relatively greater amplitude than data signals or portions thereof that are transmitted via signal lines that exhibit relatively lower transmission loss.

12. The display device according to claim 7,
wherein the plurality of image signal line driver circuits are disposed along a line, and are grouped into a first circuit group and a second circuit group that are arranged side-by-side, and
wherein the first-stage driving circuit of the first circuit group and the first-stage driving circuit of the second circuit group are disposed on respective outer ends of the line along which the plurality of image signal line driver circuits are disposed.

13. The display device according to claim 7,
wherein the display control circuit provides, to the first-stage driver circuit of each circuit group, detection signals that include order data indicating a cascade-connection order from the first-stage driver circuit to a last-stage driver circuit in the circuit group,
wherein in each circuit group, the first-stage driver circuit processes the order data to determine that the first-stage driver circuit is at a first stage in the cascade connection, and provides, to the second-stage driver circuit, only a portion of the detection signals that includes order data indicating ordinal positions of 2 or greater, to be processed by the one or more later-stage driver circuits in the circuit group, and
wherein, when there are two or more of the later-stage driver circuits, each of the later-stage driver circuits, except a last-stage driver circuit, provides, to a next-stage driver circuit that is immediately downstream thereof, only a portion of the detection signals to be processed by the next-stage driver circuit and further downstream later-stage driver circuits, if any.

14. A display method for displaying images via a plurality of pixel formation regions arranged along a plurality of image signal lines for transmitting a plurality of image signals and along a plurality of scanning signal line that intersect with the plurality of image signal lines, the display method comprising:
- an image signal line driving step of driving the plurality of image signal lines in accordance with image signals representing the images via a plurality of image signal line driving circuits that drive the plurality of image signal lines, each of the image signal line driver circuits driving a subset of the plurality of image signal lines assigned thereto, the plurality of image signal line driver circuits being grouped into one or more of circuit groups,
- a scanning signal line driving step of selectively driving the plurality of scanning signal lines; and
- a display control step of providing, to each circuit group of the plurality of image signal line driver circuits, data signals corresponding to the image signals to be provided to the image signals corresponding to the image signals to be provided to the image signal line driver circuits in the circuit group, said data signals being provided to only one of the image signal line driver circuits in the circuit group, wherein the image signal line driver circuits in each circuit group are:
- a first-stage driver circuit that receives the data signal from the display control circuit; and
- one or more later-stage driver circuits that are cascade-connected in order one-by-one after the first-stage driver circuit, wherein the method further comprises, with respect to each circuit group:
- causing the first-stage driver circuit to provide to a second-stage driver circuit connected immediately downstream thereto only a portion of the data signals that is to be used in the one or more later-stage driver circuits in the circuit group; and
- when there are two or more of the later-stage driver circuits in the circuit group, causing each of the two or more the later-stage driver circuits, except a last-stage driver circuit, in the circuit group to provide, to a next-stage driver circuit that is immediately downstream thereof, only a portion of the data signals that is to be used in the next-stage driver circuit and further downstream later-stage driver circuits, if any,
  - wherein in each circuit group, the cascade-connection of the image signal line driver circuits is switchable between two different connection schemes,
  - wherein the display control circuit alternately switches between the two connection schemes at a prescribed time interval, and
  - wherein the prescribed time interval is a multiple of one or more of a period during which one of the scanning signal lines is selectively driven by the scanning signal line driver circuit.

* * * * *